Sept. 2, 1941.　　　　W. SWALLOW　　　　2,254,457
VEHICLE
Filed April 4, 1938　　　　6 Sheets-Sheet 3
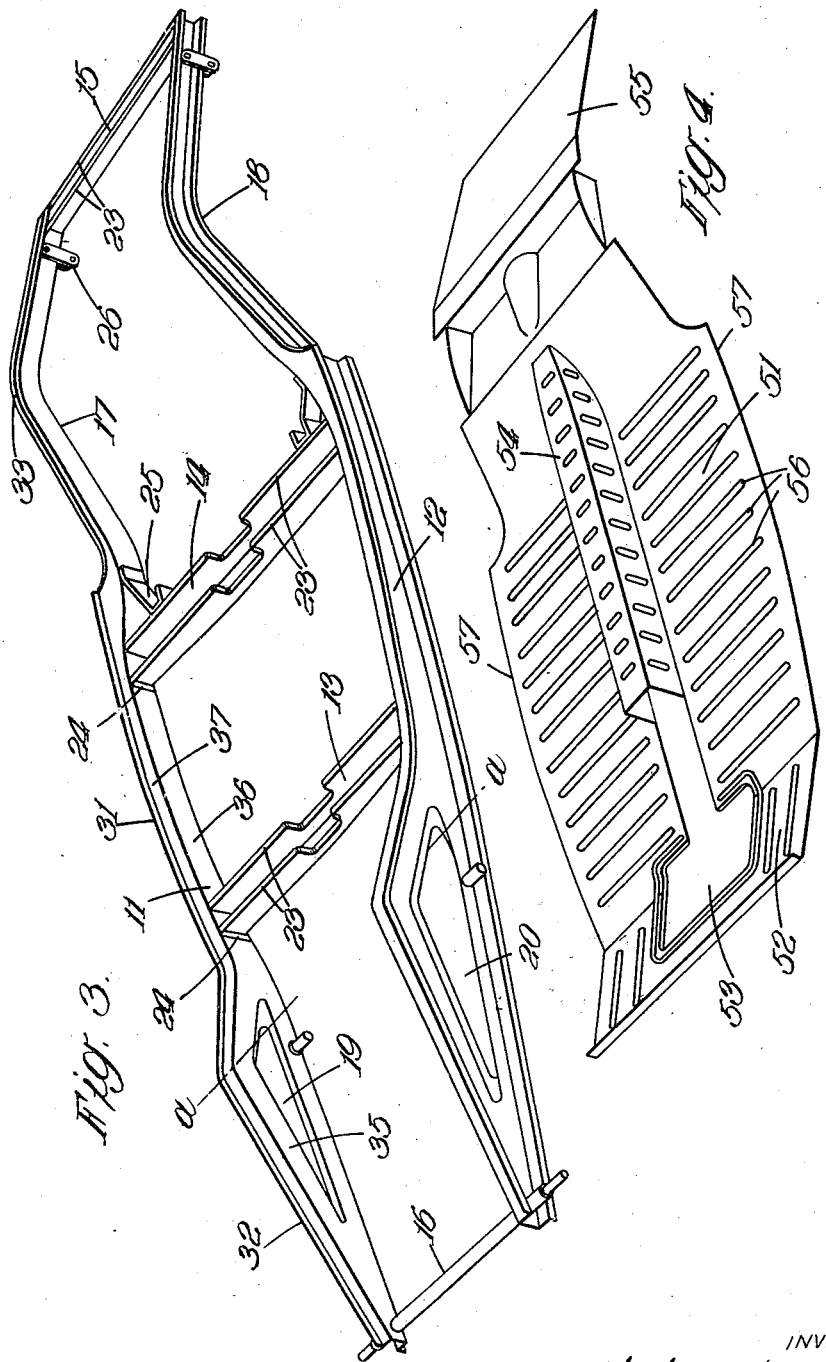
INVENTOR
William Swallow
BY John P. Tarbox
ATTORNEY Sept. 2, 1941.  W. SWALLOW  2,254,457
VEHICLE
Filed April 4, 1938  6 Sheets-Sheet 4
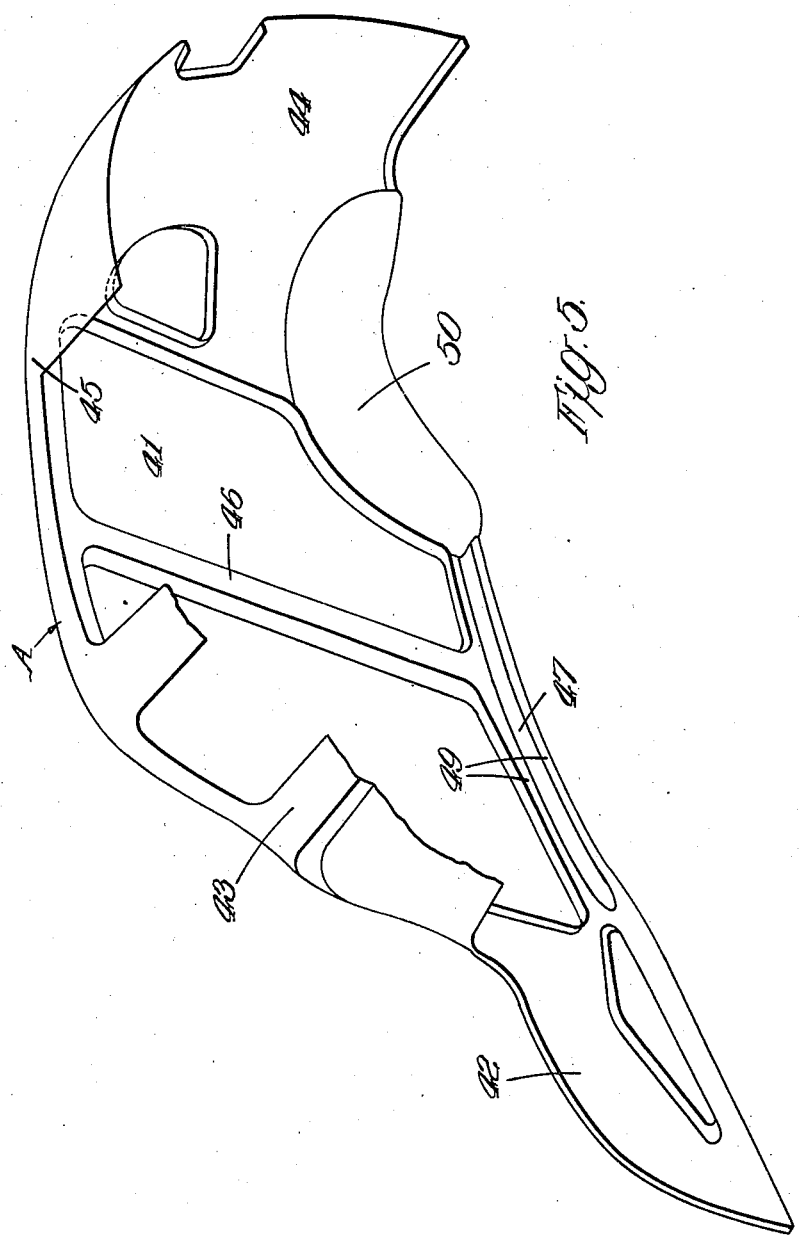
INVENTOR
William Swallow
BY John P. Tarbox
ATTORNEY

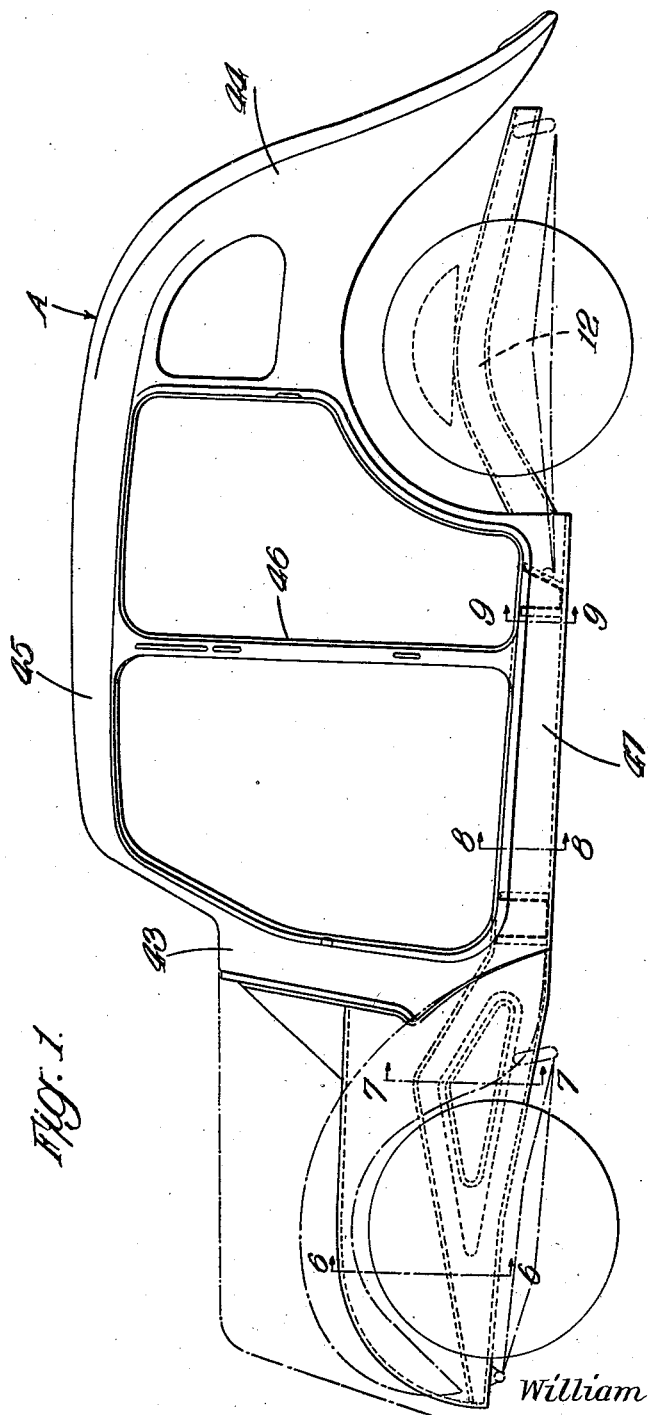

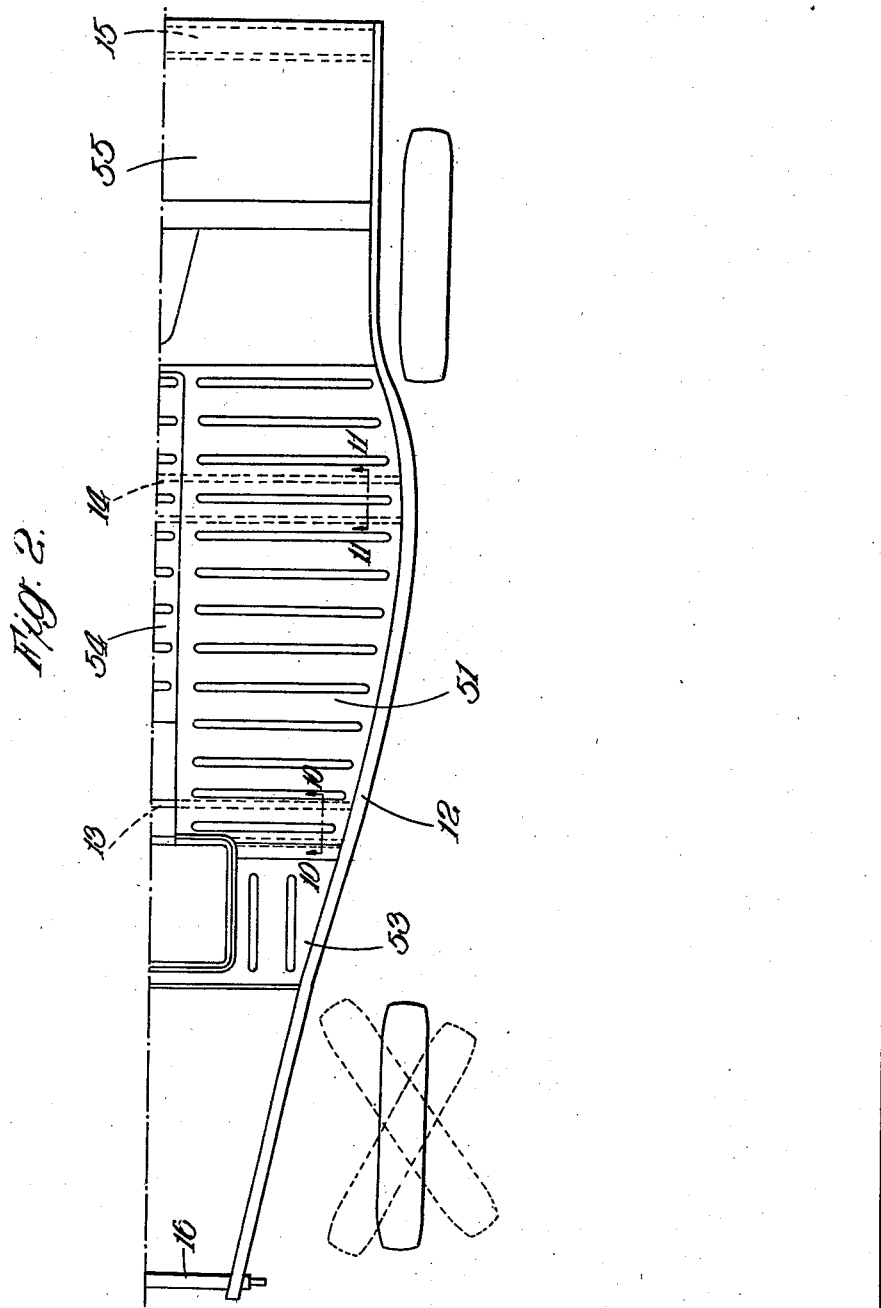

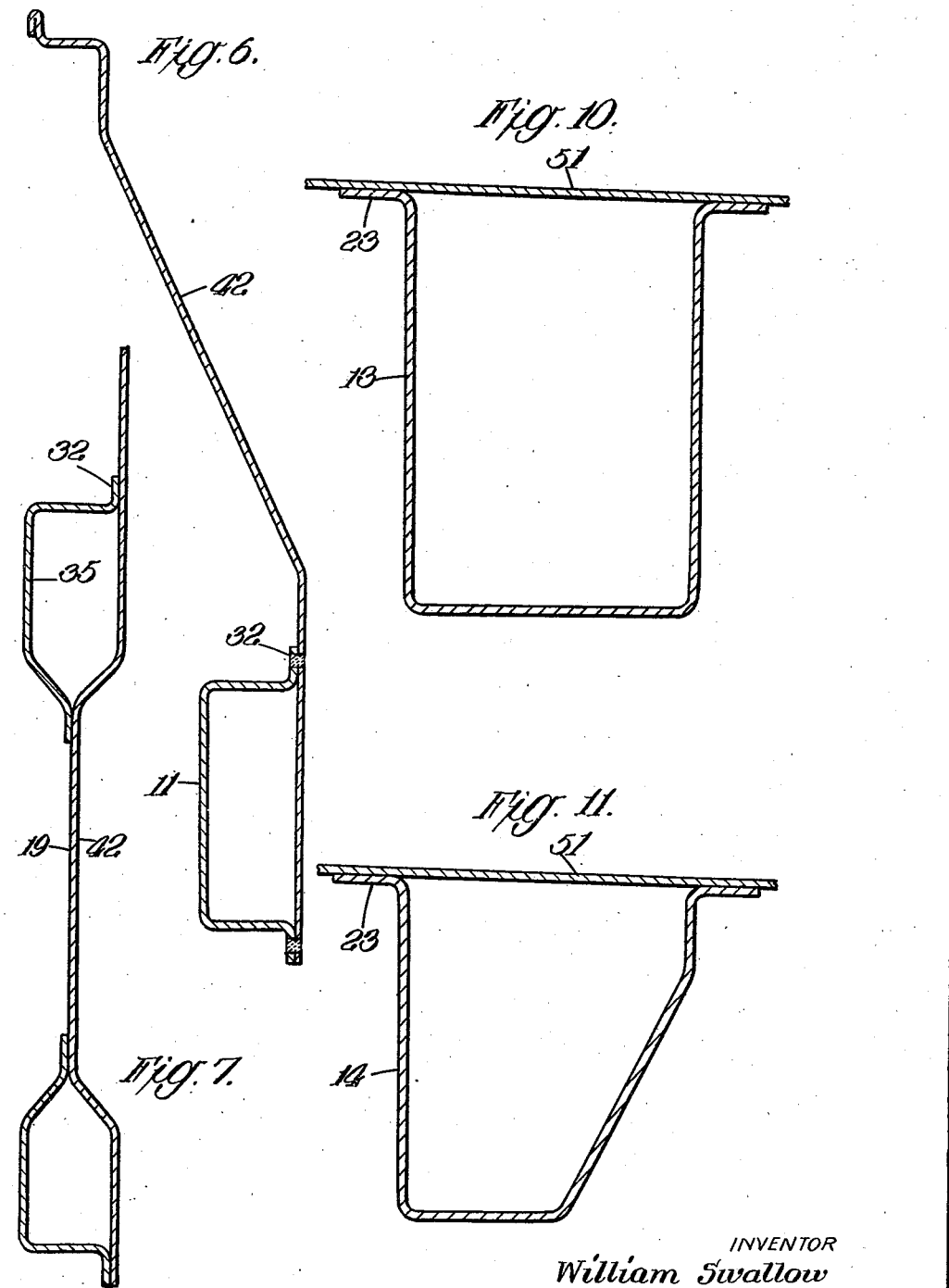

Sept. 2, 1941.    W. SWALLOW    2,254,457
VEHICLE
Filed April 4, 1938    6 Sheets-Sheet 6
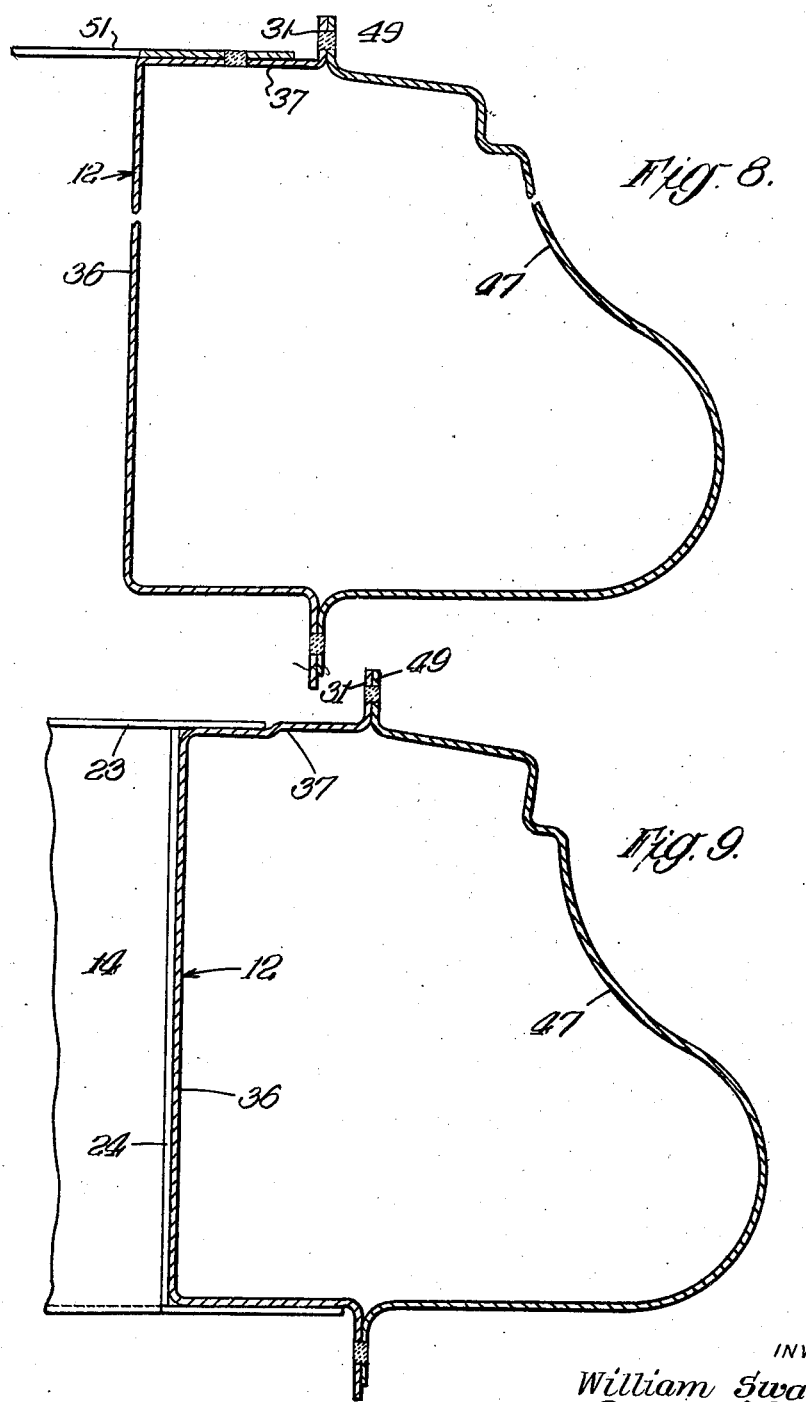
INVENTOR
William Swallow
BY John P. Tarbox
ATTORNEY Patented Sept. 2, 1941

2,254,457

UNITED STATES PATENT OFFICE 2,254,457

VEHICLE

William Swallow, Headington, Oxford, England, assignor to Pressed Steel Company Limited, Cowley, Oxford, England, a British company Application April 4, 1938, Serial No. 199,826
In Great Britain April 9, 1937

4 Claims. (Cl. 296—28)

The present invention relates to a vehicle structure preferably composed of sheet metal in which the underframe structure and the body structure are built as separate indepedent units but in the complete vehicle are essential the one to the other, to provide a unitary construction or what may be termed a combined body and underframe structure.

By the expression underframe structure should be understood, a structure capable in itself of being self supporting to an extent sufficient to facilitate handling and manipulation during the processes of manufacture, and if desired, capable of supporting the engine, springs, wheels, etc., but not necessarily sufficiently strong and rigid to take the place of the conventional chassis frame. Similarly by body structure is meant a self-supporting structure, which can be handled as a unit in the processes of manufacture, i. e. it can, if desired, be trimmed with upholstery etc., but is yet not sufficiently strong to provide the strength of the complete vehicle.

The object of the invention is to provide an improved structure of this kind giving less overall weight without a decrease in strength and ensuring greater ease of manufacture and assembly of the vehicle.

According to the present invention a vehicle is built up of an underframe structure and a body structure, the underframe structure being composed substantially of open section members which are closed to present box section structures when the body structure and/or the floor unit is asembled therewith.

In this invention the floor constitutes an important stress resisting feature of the construction. Preferably the floor is a one piece sheet-metal unit, or it may be a built-up sheet-metal structure, formed with channel section or like depressions, which floor unit on assembly with the open section underframe structure, closes some or all of the open section members thereof to present box section members both longitudinally and transversely of the vehicle and obliquely thereof if the underframe includes oblique open section bracing members.

In the assembly of a vehicle in accordance with the invention the floor unit may either be asembled with the underframe structure to provide a plurality of box section members and then the body structure be assembled thereto to complete the box sectioning of any open section members of the underframe structure not closed by the floor unit, or alternatively the floor unit may be assembled with the body structure and then mounted on the underframe structure to close in combination all the open section members of said underframe.

It should be understood that the underframe structure, the floor unit and the body structure are preferably manufactured separately but although individual units, each is essential to the other in the final vehicle structure. The underframe structure by itself possesses sufficient strength and rigidity to function as a chassis frame on which may be carried the power mechanism, transmission mechanism and the suspension system, before the floor unit or body structure are mounted thereon. Alternatively the underframe structure, floor unit and body superstructure may be assembled into the complete vehicle prior to the mounting of the power, transmission and suspension units, whichever is found to be the most practicable for the particular assembly methods adopted.

The underframe structure will be arranged for carrying the power, transmission and suspension units in a suitable manner.

Preferably the underframe structure includes open section longitudinal side members which are closed by the side panels of the body structure and constitute in combination therewith strong torsion resisting body side walls. The side members of the underframe structure, where they project forwardly or rearwardly of the passenger carrying compartment of the vehcile, are of deep vertical section to provide strong cantilever or truss-type supports for the power and suspension units. Preferably in these fore and/or aft extensions the underframe side members of open section are bifurcated to form braced box section structures when the body structure and/or the floor unit is assembled therewith. In order to provide stability of the walls of either the underframe structure, the floor unit or the body structure, or of all of them, they may be formed with corrugations or otherwise reinforced.

The floor unit is formed to accommodate the transmisison mechanism and apertured or otherwise formed for the acommodation of essential shafts, rods, wires and so forth.

The body structure may be of the closed type, or open type. The construction of course may be used for passenger carrying or commercial vehicles, both large and small, and with the power unit and power driven wheels at each or either end of the vehicle or in any other intermediate location.

Although a sheet metal construction is primarily contemplated, it must be understood clearly that the units may be of castings, e. g. light alloy castings, or of moulded material, e. g. synthetic resin.

The invention is illustrated by way of example in the accompanying drawings, of which—

Figure 1 is a side elevation of a vehicle, the doors, which may be of any known construction, being omitted;

Figure 2 is a half plan view of the underframe structure;

Figure 3 is a perspective view of the underframe structure;

Figure 4 is a perspective view of the floor;

Figure 5 is a broken-away perspective view of the body structure; whilst

Figures 6 to 9 are sections on the lines 6—6, 7—7, 8—8, 9—9 of Figure 1, and Figures 10 and 11 are sections on the lines 10—10, and 11—11 of Figure 2.

The underframe structure (Figures 2 and 3) is built up of two outwardly presenting channel-section members 11 and 12 interconnected by upwardly presenting channel-section transverse members 13, 14 and 15, whilst at the front end the longitudinal side members 11 and 12 may be interconnected by a tubular member 16.

The longitudinal members 11 and 12 are preferably contoured longitudinally to correspond with the contour of the lower margins of the body structure and towards their rear ends are arched upwardly as at 17 and 18 to accommodate the rear axle. At their forward ends the side members 11 and 12 are formed of gradually increasing depth to a point a—a, forwardly of the cowl and thereafter of gradually decreasing depth to the front end of said side members. The webs 35 of the side members 11 and 12 in the region of increased depth are pierced to present flanged apertures 19 and 20, the resulting structures presenting in effect bifurcated outwardly presenting channel-sectioned flanged members.

Each of the transverse members 13, 14 and 15 is flanged horizontally as at 23 and, at their ends, are flanged as at 24 through which flanges they are secured to the webs 36 of the longitudinal channel-section members 11 and 12, preferably by spot welding. At their junction with said longitudinal members 11 and 12 the transverse members 13, 14 and 15 may be reinforced by the provision of angle brackets (not shown), and so forth. Brackets 25 secured between the transverse member 14 and the longitudinal side members 11 and 12 in addition to strengthening the structure serve primarily as the forward anchorage for the rear springs the rear anchorage being provided by the shackle brackets 26. The engine, gear-box, steering mechanism, transmission suspension systems and so forth, are mounted on the underframe structure in any well-known manner.

It will be clear from Figures 3, 6, 7, 8, 9, 10 and 11 that the underframe structure is comprised of a plurality of flanged channel-section members, the flanges of the longitudinal and transverse members being disposed to facilitate attachment thereto of, for example, the sheet metal floor (Figure 4) and the body structure (Figure 5). The members constituting the underframe structure are preferably constructed of sheet metal and by their formations and assembly they present a self-supporting structure. It must be understood, however, that the invention is not limited to the use of a sheet metal underframe structure, although such a structure is desirable and preferable on account of the great saving in weight which it is possible to achieve and the great ease with which it can be fabricated. It could, if desired, be fabricated of light alloy castings or in some instances of pressed moulded synthetic materials.

The body structure itself consists of a shell A which may, for example, be built up of a plurality of sheet metal stampings, or which may be of composite construction, that is to say, a body structure built up of a framework of wood or metal to which exterior panelling or sheathing is secured, or which may be a shell composed of a suitable synthetic resin or like mouldable material formed to the requisite shape. Whatever form of body structure be employed, however, it will be formed in its lower margins with portions for co-operation with the channel section members of the underframe structure to present therewith a strong and rigid framework of box-section members.

The body 41 is formed at its front end with forwardly extending portions 42 which embrace the engine mounting space, the cowl portion 43, tonneau portion 44, roof 45, centre post 46, and threshold portions 47.

The forwardly extending portions 42 of the body structure are arranged to bear against the bifurcated flanged forward portions of the underframe and to be secured thereto through the flanges 32 of the latter.

In the threshold regions the longitudinal body sills 47 are of inwardly presenting channel section with substantially vertical flanges 49 which in the final assembly mate with, and are secured to, by e. g. spot welding, the flanges 31 of the longitudinal members 11 and 12 of the underframe structure. In the region of the front and rear wheel housings the body panels 42 and 50 are arranged to bear directly against, and be secured to, the flanges 32 and 33 of the portions 17 and 18 of the longitudinal side frame members 11 and 12.

A floor unit shown in Figure 4 is comprised of a pan 51 formed at its front ends with a toeboard 52 and a cut-out 53 to house the gear-box etc. A transmission shaft tunnel 54 runs longitudinally of the pan 51 which at its rear end is turned upwardly to present a rear seat support or pan 55. The pan 51 may be formed with a plurality of transverse depressions 56 to give stability thereto.

The order of assembly of a vehicle as described is firstly the fabrication of the underframe structure of Figure 3, the floor panel of Figure 4 is then placed on and secured to, preferably by welding, the underframe structure, the edges 57 of the pan 51 being welded to the horizontal flanges 37, of the longitudinal side frame members 11 and 12. The pan 51 is further secured as by welding to the horizontal flanges 23 of the transverse bracing members 13, 14 and 15 forming therewith strong box section transverse braces. The body of Figure 5 is then dropped onto the assembled underframe structure and floor panel and secured thereto, preferably by welding, through the mating flanges 49 of the body and 31, 32 and 33 of the longitudinal side frame members 11 and 12.

By this assembly there is provided in addition to the strong transverse box sections, strong longitudinal box sections created by the union of the body structure and the underframe structure.

As an alternative to the foregoing the order of assembly may be, firstly, the underframe structure of Figure 3, secondly, the body structure of Figure 5 to which is secured the floor pan of Figure 4 the assembled body structure and floor pan being then mounted on and secured to the underframe structure.

It is essential to bear in mind that according to this invention there are provided primarily two separate and distinct units, namely, the underframe structure and the body structure, each of which is fabricated independently of the other and each of which is a self-supporting unit in itself. In the final assembly the two units combine, with the floor unit to present the complete vehicle. Each unit is dependent on the other to provide the requisite strength and stiffness and it is not until the two units are combined that the requisite strength and rigidity is obtained. The combination of a self-supporting underframe structure and a self-supporting body structure presents closed hollow section strong structural members which are not present in the individual structures.

With a vehicle as described above it is possible to produce the underframe structure, the floor unit and the body structure as separate elements according to known methods of production and when assembled together the complete unitary vehicle has a maximum degree of stiffness with minimum weight giving improved operation and economy by reason of the reduction in weight due to the ability to make use of the most efficient disposition of metal entering into the construction.

Furthermore, different styles of body e. g. saloon, coupé, cabriolet, and tourer, fall quite readily within the scope of this invention, whilst variations in styles of bodies to suit changing conditions are accomplished with facility.

I claim:

1. A vehicle built up of an underframe structure, a floor and a body structure which in combination present a principal load carrying framework of closed section members, said body comprising a cowl, the underframe structure including outwardly presenting channel shaped longitudinal side members extending from end to end of the vehicle, said longitudinal side members being of increased height for a portion of their length, the height being greatest at a point in the region of said cowl, the webs of said longitudinal side members in the region of increased height being apertured and flanged to present a bifurcated outwardly presenting channel section member which is closed by the lower marginal portion of the body side wall panel.

2. In a vehicle, a longitudinal side sill member extending beyond the region of a body compartment proper into the region of a motor compartment, said side sill member increasing in height toward the region where said body compartment and said motor compartment meet, said member being of generally outwardly facing channel shape, the channel being bifurcated in the region of increased depth, and an outer panel being fastened to the margins of said sill members as to form a closed box sectional girder which is bifurcated in the region between the body compartment and the motor compartment.

3. In a vehicle according to claim 2 the outer panel being inwardly offset in the region of the bifurcation of the side sill member, the offset portion of the outer panel being connected to those flanges of the sill member which define the bifurcation.

4. In an automobile, a combined body underframe and chassis unit comprising longitudinal side sill members interconnected by cross brace members, a downwardly open body superstructure unit comprising the upstanding body walls, a flooring unit, said three units being independently assembled and adapted to be brought unobstructedly into the relative position for final assembly, said side sill members comprising each a substantially vertical web, the upper and lower margins of said webs and the lower marginal portions of said body walls being provided with complementary connecting means as to form by the assembly of said underframe unit with said body superstructure unit closed box sectional side sill structures, at least some of said cross brace members being in the form of upwardly facing channels, said flooring unit being fastened along its side margins to said side sill members and along transverse lines to both upper margins of said channel formed cross brace members as to form with the latter close box sectional cross braces.

WILLIAM SWALLOW.